United States Patent [19]

Steinmetz

[11] 4,453,128

[45] Jun. 5, 1984

[54] DIGITAL DISPLAY TESTING CIRCUIT

[75] Inventor: John H. Steinmetz, Norwalk, Conn.

[73] Assignee: Pitney Bowes Inc., Stamford, Conn.

[21] Appl. No.: 258,870

[22] Filed: Apr. 30, 1981

[51] Int. Cl.$^3$ .............................................. G01R 31/024
[52] U.S. Cl. .............................. 324/403; 324/73 AT;
324/409
[58] Field of Search ............... 324/403, 404, 405, 406,
324/407, 408, 409, 64, 73 AT, 99 D, 410, 411;
315/169.1; 340/715; 371/20; 364/481, 483

[56] References Cited

U.S. PATENT DOCUMENTS

| 1,718,557 | 3/1925 | Hickok | 324/411 |
| 3,761,766 | 9/1973 | Hatano et al. | 315/169.1 |
| 4,158,431 | 6/1979 | van Bavel et al. | 371/20 |
| 4,158,794 | 6/1979 | Sandler | 315/169.1 |

Primary Examiner—Michael J. Tokar
Assistant Examiner—Kevin D. O'Shea
Attorney, Agent, or Firm—Robert H. Whisker; David E. Pitchenik; Albert W. Scribner

[57] ABSTRACT

A circuit for testing a segment of a digital display comprising a segment of a digital display having a cathode filament for conducting electrical current and for emitting electrons, and detecting means connected to the cathode filament for detecting electrical current flow across it. Also provided is a method for testing the proper operation of characters or digits of a digital display.

19 Claims, 8 Drawing Figures

DIGITAL DISPLAY TESTING CIRCUIT

BACKGROUND OF THE INVENTION

1. Field of the Invention

The present invention relates to testing circuitry, and more particularly to circuitry used in testing the proper operation of a digital display.

2. Description of the Prior Art

A wide variety of electronic equipment incorporates the use of displays to indicate status and instructions to an operator or user of the equipment. Often these displays are digital displays, comprised of segments that are individually activated to represent digits or rudimentary alphabetic characters. The most common configuration of characters for these displays requires the use of seven segments.

Displays are generally available in three categories: planar gas discharge (PCG), light emitting diode (LED), and vacuum fluorescent display (VFD). In operation, all of these types of digital displays are most often time multiplexed. That is, when the display appears on, different characters are actually being activated or energized but not simultaneously. Only one character at a time is energized. As each character is enabled, some combination of segments is turned on, resulting in an energized digit that appears in the enabled character location. Each character is enabled in this way, in sequence, at a rate fast enough to ensure that human eyes perceive display characters to be on constantly, without appearing to flash or flicker.

The operation of digital displays can be appreciated with reference to the description thereof in U.S. Pat. No. 4,224,506, issued to Coppola et al and assigned to the assignee of the present invention.

Manufacturers have discovered that portions of these digital displays may fail under certain circumstances, such as when a filament burns out, when internal wiring breaks or short circuits, or when a tube cracks, destroying the vacuum. When a failure occurs or is about to occur, it may be important that the operator of a device incorporating a digital display be aware of such a failure. Without this knowledge, the operator may obtain undetected erroneous results. For example, if the center segment of a character "8" fails, the character "0" is displayed. The operator would thus be unaware of the failure resulting in this undetected erroneous display.

The need for determining whether a digital display is operating properly has long been recognized. U.S. Pat. No. 3,742,356, issued to Brock, for example, discloses a method and apparatus for testing LED displays. The apparatus disclosed therein, however, is for specific use with LED's, in which sockets for receiving integrated circuit packages are sequenced at a predetermined rate with the number of sockets being sequenced equal to the reciprocal of a duty cycle at which the diodes are being tested. The magnitude of the voltage being supplied by the source varies as a function of the duty cycle and the average current rating of an LED.

An operator using the Brock apparatus is not made aware of a display failure unless he visually inspects each segment of each character in the display for markedly less brightness or a total lack of display in one of the segments. Moreover, the testing apparatus disclosed in the Brock reference is not intended to be used while the display is in operative relationship to the device with which it is to be used. Rather, the display must be disconnected from its associated device for testing purposes, making the testing of installed displays extremely inconvenient, if not impossible.

SUMMARY OF THE INVENTION

It is desirable to test digital displays of the vacuum fluorescent type electrically while the display is in operative condition suitable for use in the device for which it was designed, thus obviating the requirement that an operator visually inspect each segment of each character outside of the intended environment of the display. An electronic circuit for use in such testing is therefore most advantageous. Similarly, it is advantageous to provide checking or testing circuitry which utilizes much of the same components as are required to activate the display, adding few parts and microprocessor I/O lines.

In accordance with the present invention, there is provided a circuit for testing a segment of a digital display comprising a segment of a digital display having a cathode filament for conducting electrical current and for emitting electrons, and detecting means connected to the cathode filament for detecting electrical current flow across it both when the display segment is energized and when it is de-energized. Moreover, there is provided a method for testing the proper operation of characters or digits of a digital display in which each of the characters has a digit control grid and a plurality of segments, each of the segments having a segment driver and a cathode filament. The method comprises the steps of energizing the segment driver of one of the segments of the digits, energizing the digit control grid of one of the digits to select an individual digit, and determining whether the current flowing across the cathode filament corresponding to the selected segment decreases when the segment driver is de-energized, thus indicating that the segment is operating properly.

BRIEF DESCRIPTION OF THE DRAWING

FIG. 6 is a circuit diagram of one embodiment of the testing circuit in accordance with the present invention, including AC coupling circuitry;

DETAILED DESCRIPTION OF THE PREFERRED EMBODIMENT

Figure 1:
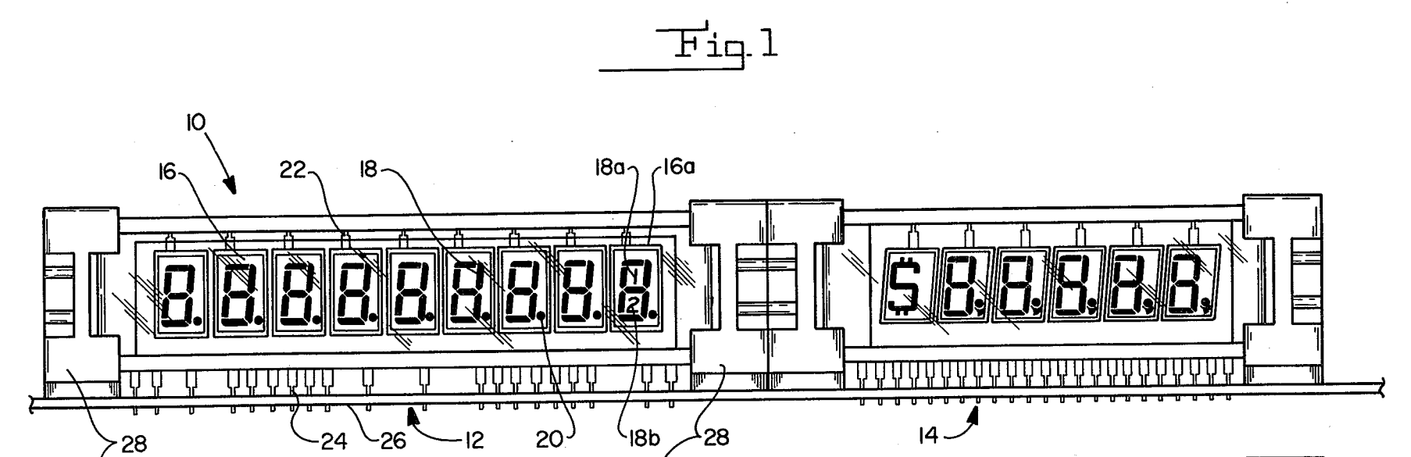
FIG. 1 is a front view of a vacuum fluorescent display having segmented characters in accordance with the present invention.

Referring now to FIG. 1, there is shown a vacuum fluorescent display or tube 10 having two sides 12 and 14 with provision for displaying nine digits and six digits respectively. The digits 16 each have seven segments, shown generally at reference numeral 18 in a figure "8" configuration. In addition, a decimal point 20 is also provided for each digit 16. One of the digits 16a is also provided with two additional segments 18a and 18b in the form of a reduced numeral 1 and a reduced numeral 2 respectively. This digit 16a thus has the ability to display either any digit from 0 through 9 or the fraction ½.

It is to be understood that any suitable configuration of digits or characters, having any number of segments in a digital or alphanumeric display, can be tested by the present invention. The two-banked system shown in this embodiment, however, is typical of the vacuum fluorescent display manufactured by the Futaba Company under the Model Nos. 6-LT-07 and 9-LT-01. Of course, it is to be understood that a one-bank, 15 digit tube could be used to replace the standard six and nine digit tubes shown in this embodiment.

Grid lines, hereinafter described in greater detail, are shown as reference numeral 22. A grid line 22 corresponds to each of the digits 16 of the display 10. Anode lines 24 are shown connected to the lower portion of the display 10. One anode line 24 corresponds to each segment 18 of the digits 16 in the display 10. A circuit board 26 is used for mounting the pins 24. Similarly, the housing 28 is used to mount both blanks 12 and 14 of the display 10 to the circuit board 26 as well as to mount the entire display 10 on the apparatus, not shown, with which it is intended to be used.

Figure 2:
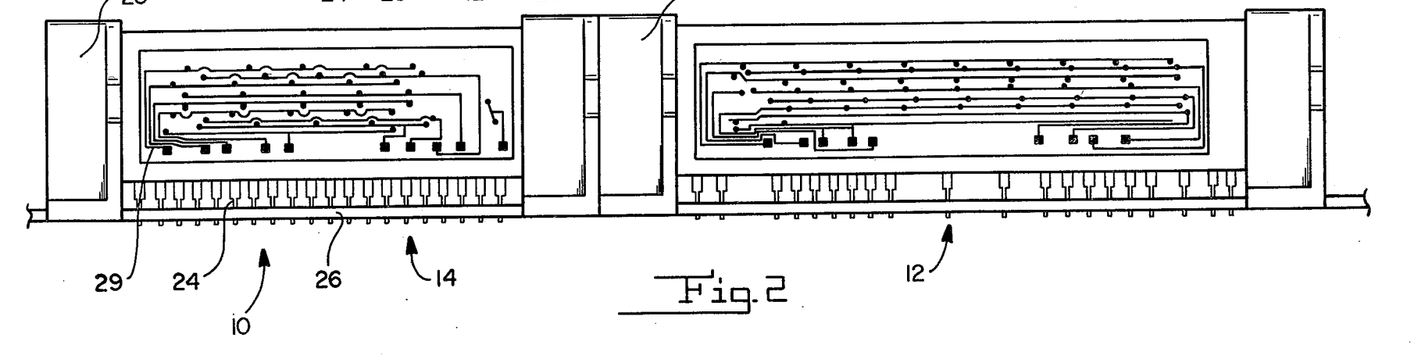
FIG. 2 is a rear view of the vacuum fluorescent display shown in FIG. 1.

FIG. 2 shows a rear view of the display 10 and printed circuit lines 29 connecting the segments 18 to the pins 24 which are mounted on the circuit board 26.

Figure 3:
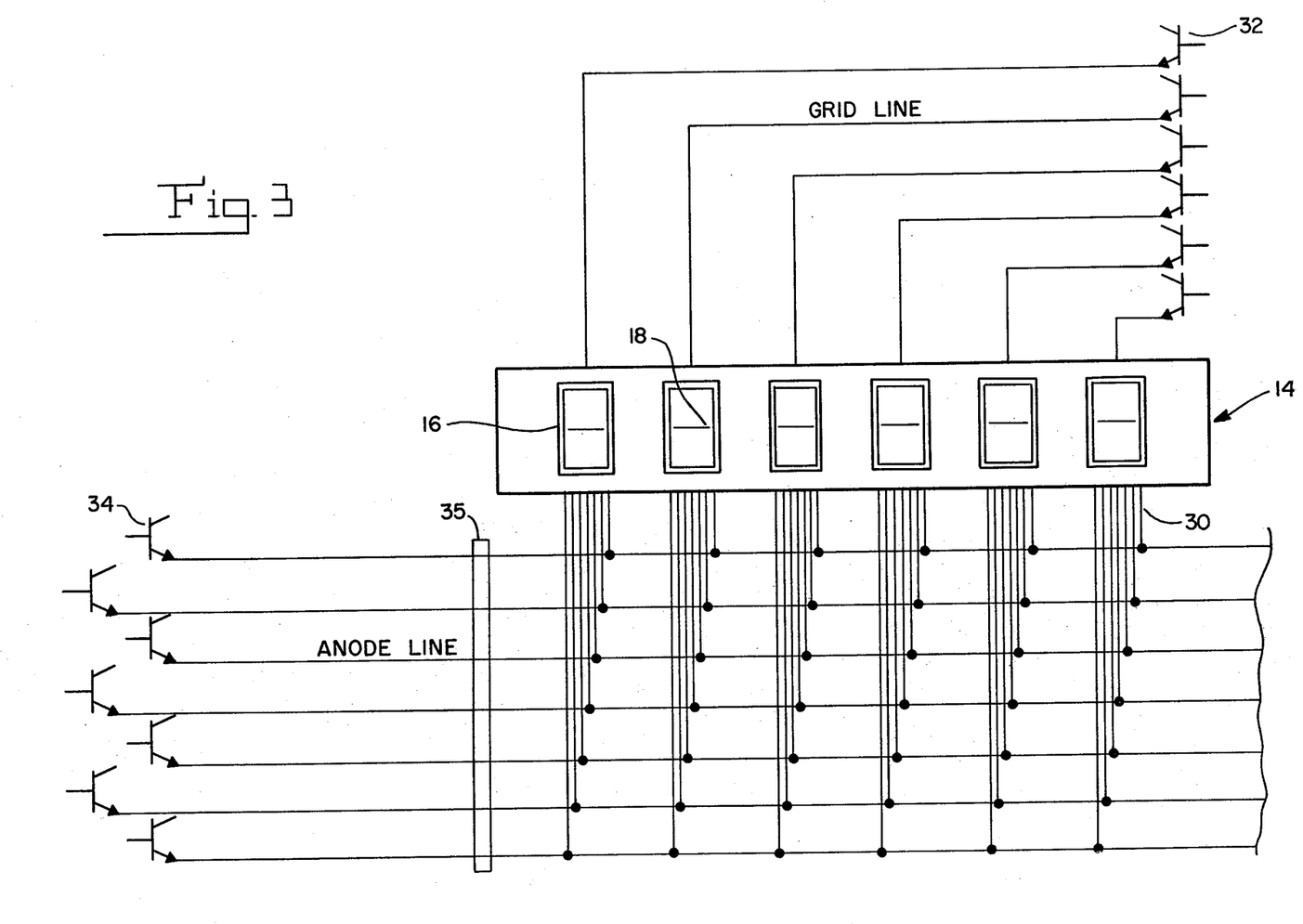
FIG. 3 is a circuit diagram partially showing the electrical connection internal to a vacuum tube and partially showing the electrical connections external to the tube among all of the characters in a six digit display.

Referring now to FIG. 3, the right bank 14 of the display 10 is shown in a symbolized schematic representation. The display digits 16 have seven segment wires 30 and a decimal point wire, not shown, carried in parallel to display segments 18 of each digit 16. The right bank 14 of the display 10 houses six digits 16 within the vacuum tube. Each digit 16 is turned on in sequence by energizing its grid via a separate digit select driver or wire 32. Similarly, seven individual segment drivers 34, such as Sprague Co. Model No. ULN6118A, corresponding to the seven segment wires 30 are provided to energize the anodes of each of the display segments 18 sequentially. The segment drivers 34 are shown connected to a tube connector 35 to indicate diagrammatically that the segment wires 30 are all internal to the tube.

Figure 4:
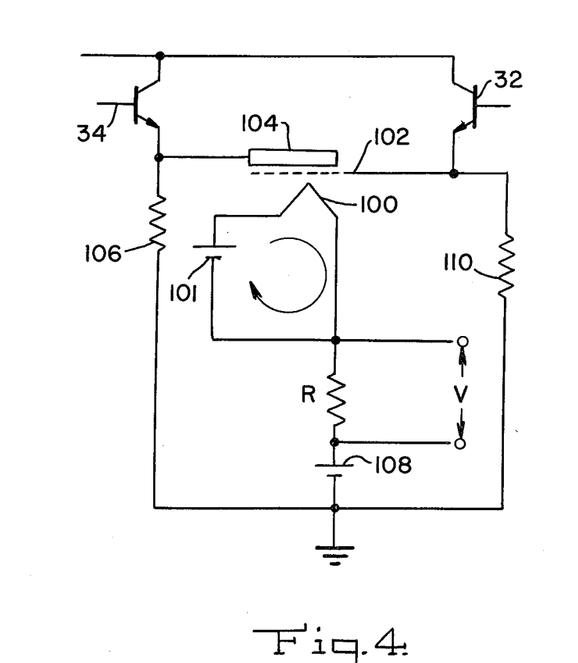
FIG. 4 is a circuit diagram of one segment of the vacuum fluorescent display.

Referring now to FIG. 4, the display 10 is energized by a circuit comprised of the following components. A cathode filament 100 is provided to boil off electrons. A low voltage supply 101 is connected to the filament 100 to generate cathode filament current flow in the clockwise direction of the arrow shown in FIG. 4. Normally this filament 100 does not have sufficient current to glow. The filament 100 is connected to all of the digits 16 in the tube.

A separate control grid 102 is connected to each digit 16. The control grid 102 is connected to the corresponding digit select driver 32 to provide a grid voltage through it. An anode 104 is proximately located with respect to the control grid 102 and is connected to the corresponding segment driver 34. The segment driver 34 is also grounded through a resistor 106.

All of the digits 16 of the display 10 can be illuminated segment by segment according to a conventional multiplexing scheme as shown, for example, in U.S. Pat. No. 4,224,506.

If a digit 16 is to be multiplexed on, the digit control grid 102 is energized to a positive voltage, typically about 40 to 60 volts. If a digit 16 is to be turned off, the control grid 102 is held negative, at −4 to −6 volts, for example, with respect to the voltage carried across the filament 100, which voltage is supplied by a bias voltage source 108 hereinbelow described. When the digit control grid 102 is positive, grid current is generated, regardless of whether any segment 18 is to be energized, as hereinafter described.

If a segment 18 is to glow, the digit control grid 102 must be positive and the voltage carried by the segment must also be positive.

Electrons pass from the filament 100 through the digit control grid 102 and impinge upon the anode segment 104. The anode segments 104 are coated with a material that gives off light when impinged upon by electrons.

In accordance with the present invention, each of the display segments 18 can be tested for proper operation by monitoring the resultant cathode current flow when the segment 18 is turned on or off while the grid is positive. For this purpose, a resistor R is provided between the filament 100 and ground, across which resistor R the cathode current can be measured. For purposes of this description, the voltage potential across resistor R is hereinafter referred to as V. A bias voltage source 108, which supplies voltage across the filament 100, is also provided between the resistor R and ground. A pull-down resistor 110 is provided between the digit control grid 102 and ground so that when either the digit select driver 32 or the segment driver 34 is off, the digit control grid 102 is pulled down to ground.

It can be assumed that a segment 18 is defective if the cathode current does not change significantly (i.e., more than a predetermined amount) when the segment 18 is switched on or off. That is, during the monitoring operation, each energized segment must result in a current level which exceeds a minimum value to ensure the proper functioning of that segment.

This test process checks the display filament supply 101, the tube filaments 100, the display anode supply, not shown, the microprocessor link to the segment and digit display drivers, not shown, the driver chips 32 and 34, and the display tube 10.

Figure 5:
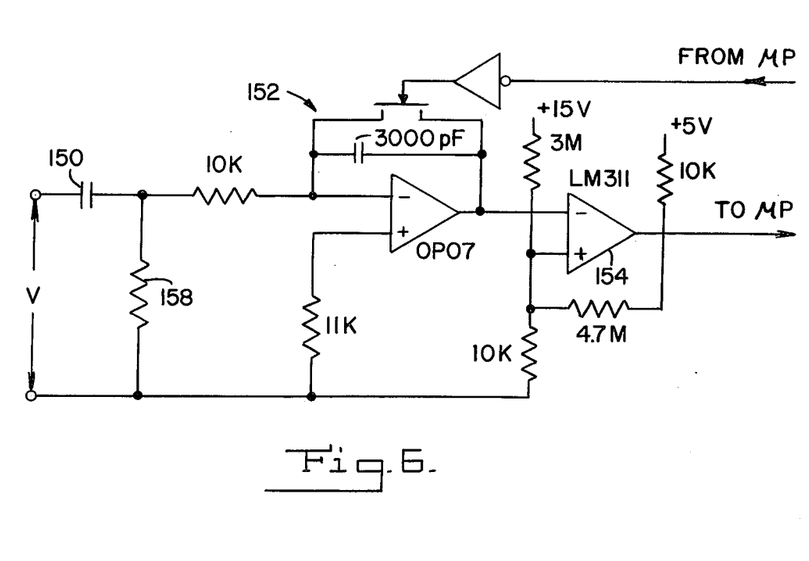
FIG. 5 is a flow chart of a method by which segments of digits are displayed.

Referring now to FIG. 5, a flow chart is shown to specify the sequence of operations used to test each segment 18 of each digit 16 in the display 10. After initialization 120, a segment 18 is selected 122 by a microprocessor, not shown. A digit 16 is then energized and the previously selected segment is turned on and then off 124. A determination is made as to whether the current flowing across the cathode filament 100 has changed significantly after the segment 18 is turned off 126. If the current across the resistor R has not changed, a defective segment 18 for the specified digit 16 is indicated 128. If, however, the current across the resistor R does change significantly as a result of the digit 16 being energized and segment 18 being energized and then de-energized 126, this fact indicates that the segment 18 is working properly 130.

At this point, whether the segment 18 is determined to work properly or to be defective, the system then makes a determination as to whether all digits 16 have been tested for the specified segment 18 at reference numeral 132. If one or more digits 16 have not been tested for the specified segment 18, the next digit 16 is sequentially energized 124. If, however, all digits 16 have been tested for the specified segment 18, the determination at reference numeral 132 is affirmative and a determination is then made as to whether all segments 18 have been tested 134. If one or more segments 18 have not been tested 134, the next sequential segment 18 is then selected by the microcomputer 136. At this point, the next digit 16 is energized 124. If, however, all segments 18 have been tested 134, the testing routine is terminated 138.

It should be noted that if a segment 18 or its associated segment driver 34 has failed in an always on or an always off mode, no change in response to the segment pulse command will be detected. If a digit driver 32 has failed in an off condition, no cathode current will be present during the segment pulse. Consequently, there will be no change in cathode current.

A continually energized digit driver 32 is not normally detected by this method. A test may be incorporated to determine whether cathode current exists when all digits 16 are off, but this determination is usually not necessary. A digit 16 which is always on results in an extremely bright digit 16 and one whose segments 18 change rapidly due to the fact that the digit 16 responds to all of the segments 18, not merely those intended for it. A visual checking of the display digits 16 would immediately indicate that a digit 16 has failed in its on position. Thus an operator would not inadvertently accept an erroneous reading.

The amplitude of the cathode segment 18 current can be determined in one of several ways. Means for subtracting the control grid 102 portion of the cathode current is required. The control grid current varies from digit 16 to digit 16 within a tube 10, and from tube to tube by a factor of as much as three to one. The current can also change as the tube 10 ages. This variance can also be much greater than the current of an individual segment 18. This explains why a plurality of segments 18 are not tested simultaneously. A total of six strong segments, for example, could easily utilize the same total current as do seven weak but adequate segments. Because of the great variance among segments, the control grid 102 portion of the cathode current cannot be subtracted by a constant DC level. A significant portion of cathode current flows when a digit 16 is on and no segments 18 are lit. This current is drawn by the control grid 102 of each digit 16 when the grid 102 is driven to a positive voltage to enable the display segments 18. This current can be approximately 25 times larger than the current drawn by a single element 18. Accordingly, there is provided in the present invention three embodiments by which subtraction of grid current from the cathode current to determine segment current can be made: high pass AC coupling (FIG. 6), sample and hold (FIG. 7), and analog to digital (A/D) converter, not shown.

Referring now also to FIG. 6, there is shown an AC coupling circuit for use in determining the cathode current across the resistor R. The circuit contains a capacitor 150, integrating circuitry including an FET switch and driver 152, a comparator 154 and a +5 volt and a +15 volt source. A resistor 158 is connected in parallel across the terminals adapted to measure the potential V across the resistor R. In operation, the comparator 154 generates a signal to the microprocessor, not shown, indicative of the cathode segment current less the control grid current.

The RC time constant of resistor 158 and capacitor 150 is short with respect to the display digit "on" time. The capacitor 150 is allowed to charge to a voltage equal to the grid current plus the segment current. The display segment 18 is then turned off, and the waveform peak immediately following is ideally a measure of the segment current.

Figure 8:
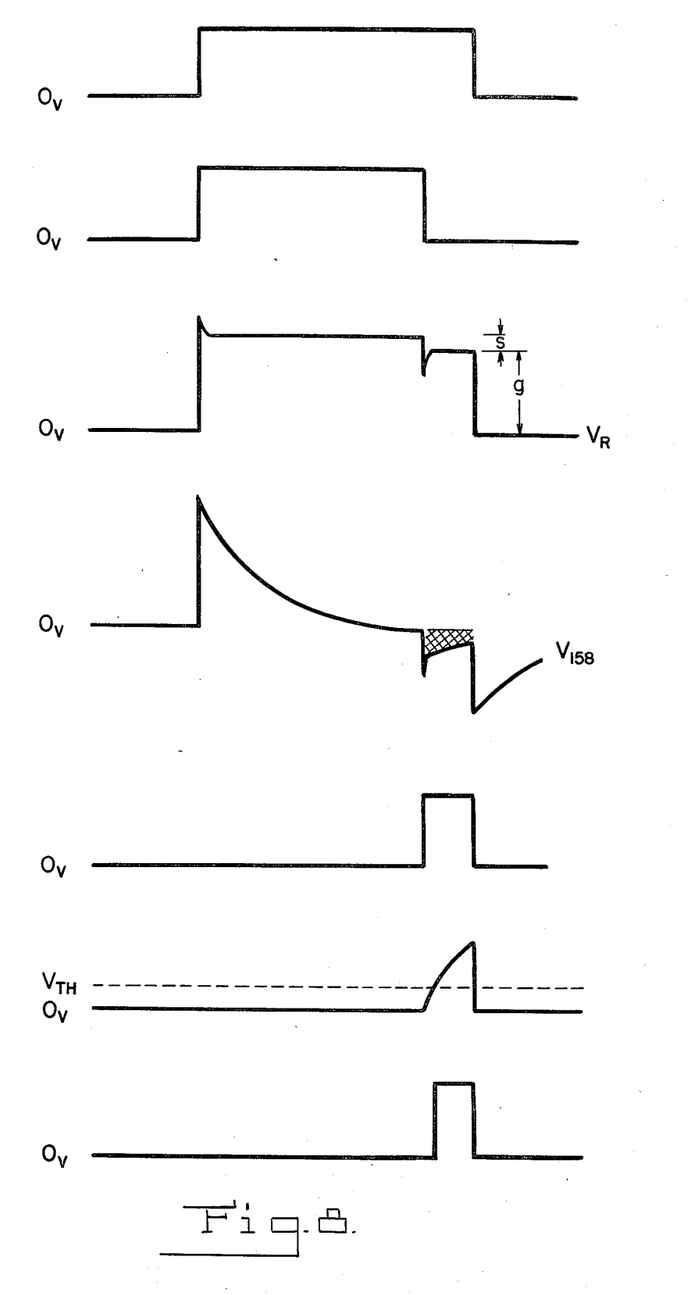
FIG. 8 is a timing diagram in accordance with the present invention.

Referring now also to FIG. 8, there is shown the resulting waveform of each component in the AC coupling circuit. The digit 16 and selected segment 18 are energized simultaneously, as shown in the top two waveforms of FIG. 8. The segment pulse is discontinued shortly before the digit select pulse. The resulting voltage across resistor R is shown as waveform $V_R$, the left spike of which represents noise. The difference in amplitude shown as distance "s" represents the amount of current corresponding to segment current change and the difference in amplitude shown as distance "g" represents the amount of current corresponding to grid current, the total of grid and segment current being proportional to the cathode current. The voltage across resistor 158 is represented by the next waveform in which the shaded portion of the $V_{158}$ waveform ideally equals "s", the segment current change after AC coupling.

Spurious cathode currents, probably caused by interelectrode capacitances and leakage currents from other display digits, require additional waveform processing. The integrator 152 provides both filtering and voltage gain. It is held in the reset state until the segment 18 is turned off, with the digit select grid 102 still on. Its peak output voltage after a suitable period of integration is a measure of the segment current. The integrator 152 attenuates low energy spikes. The integrator waveform is shown in FIG. 8.

A comparator threshold voltage $V_{th}$ is selected to determine the criteria for segment current failure. The microprocessor, not shown, reads the state of the comparator 154 near the end of a fixed integration period to determine if the segment current was adequate. The comparator waveform is also shown in FIG. 8. The comparator threshold $V_{th}$ is set to change state with the lowest normal segment current. Thus it interprets a drastic decrease in the display segment current as a display failure, but it does not detect a segment 18 with a high normal current merely becoming dim.

Figure 7:
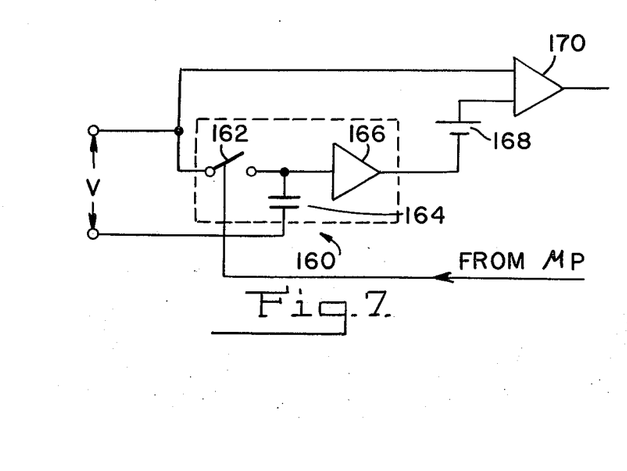
FIG. 7 is another embodiment of the circuit in accordance with the present invention, including a sample and hold circuit.

An alternative embodiment of a circuit in accordance with the present invention is shown in FIG. 7. A sample and hold circuit, shown generally in dashed lines at reference numeral 160, consists of a switch 162, a capacitor 164 and a unity gain buffer amplifier 166 connected across the terminals adapted to measure the potential V across the resistor R. This sample and hold circuit 160 is connected in series with a voltage source 168 and a comparator 170. In operation, the comparator 170 generates a signal indicative of the cathode segment current change less the minimum voltage $V_{th}$ required by the threshold voltage source 168.

In this embodiment, the control grid driver 32 is energized without the segment driver 34 being energized. The voltage V is sampled and held on capacitor 164 under command of the microprocessor by momentary actuation of the electronic switch 162. The segment driver 34 is pulsed on. The state of the comparator 170 is then read by the microprocessor. If the increase in cathode current caused by turning on the segment 18 exceeds the voltage 168, the segment 18 can be presumed to be working properly.

Another embodiment of the testing circuitry, not shown, incorporates an analog to digital (A/D) converter controlled and readable by microprocessor. The use of such an A/D converter allows a microprocessor to instruct the system when to sample, subtract A/D readings in the microprocessor to arrive at the segment current change, and compare that change to values stored during previous sampling operations. The A/D circuit also determines whether a segment 18, although decaying, is performing adequately on a segment by segment basis by comparing it with data stored previously.

The foregoing embodiment has been presented for the purpose of illustration and should not be taken to limit the scope of the present invention. It will be apparent that such embodiment is capable of many variations and modifications which are likewise to be included within the scope of the present invention as set forth in the appended claims.

What is claimed is:

1. A self-testing display circuit comprising:
   (a) a plurality of digit displays each of said displays comprising a plurality of anode segments and a grid for controlling the flow of current to said anode segments;
   (b) means for selectively enabling groups of said segments, said groups consisting of corresponding segments in each of said displays;
   (c) a cathode common to all of said displays;
   (d) means operatively associated with said grids and said segment enabling means for selectively energizing or de-energizing a particular segment without affecting any other segment; and,
   (e) detecting means operatively associated with said cathode for detecting the change in the cathode current due to energizing or de-energizing said particular segment.

2. The circuit in accordance with claim 1 wherein said means for selecting said segment of said digital display comprises a microprocessor.

3. The circuit in accordance with claim 1 wherein said means for selecting said segment of said digital display comprises an integrated circuit with provision for selective multiplexing.

4. The circuit in accordance with claim 1 wherein said means for selecting said segment of said digital display comprises:
   a grid disposed adjacent said cathode filament; and
   means operatively connected to said grid for biasing said grid to inhibit or promote the flow of emitted electrons from said cathode filament.

5. A circuit for testing a segment of a digital display comprising:
   a segment of a digital display having a cathode filament for conducting electrical current to emit electrons therefrom;
   means for selecting said segment of said digital display for testing the proper operation thereof, said selecting means including a grid disposed adjacent said cathode filament and means operatively connected to said grid for biasing said grid to inhibit or promote the flow of emitted electrons from said cathode filament; and
   detecting means operatively connected to said cathode filament for detecting change in electrical current flow thereacross when said digital display segment is caused to be energized and when said digital display segment is caused to be de-energized, said detecting means including:
   a filament power source of electrical current, one side thereof being operatively connected to the first side of said cathode filament and the second side of said filament power source being operatively connected to the second side of said cathode filament, and
   resistance means operatively connected to said second side of said cathode filament, measuring means being operatively connected to said resistance means for measuring electrical current flow thereacross, said measured electrical current being indicative of the electrical current flowing across said cathode filament.

6. The circuit in accordance with claim 5 further comprising a grid bias power source operatively connected between said resistance means and electrical ground for biasing said grid.

7. A circuit for testing a segment of a digital display comprising:
   a segment of a digital display having a cathode filament for conducting electrical current to emit electrons therefrom;
   means for selecting said segment of said digital display for testing the proper operation thereof, said selecting means including a grid disposed adjacent said cathode filament and means operatively connected to said grid for biasing said grid to inhibit or promote the flow of emitted electrons from said cathode filament; and
   detecting means operatively connected to said cathode filament for detecting change in electrical current flow thereacross when said digital display segment is caused to be energized and when said digital display segment is caused to be de-energized, said detecting means including:
   a filament power source of electrical current, one side thereof being operatively connected to the first side of said cathode filament and the second side of said filament power source being operatively connected to the second side of said cathode filament, and
   resistance means operatively connected between said second side of said cathode filament and electrical ground,
   said detecting means further comprising a high pass AC coupling circuit operatively connected across said resistance means for subtracting grid current from said cathode filament current to provide a resultant current indicative of the current flowing across said cathode filament.

8. The circuit in accordance with claim 7 further comprising a grid bias power source operatively connected between said resistance means and electrical ground for biasing said grid.

9. The circuit in accordance with claim 7, said high pass AC coupling circuit having a threshold voltage and a comparator operatively connected thereto for providing a signal indicative of the magnitude of current flowing through said cathode filament to electrical ground.

10. The circuit in accordance with claim 9 wherein said high pass AC coupling circuit includes integrating means operatively connected to said comparator.

11. The circuit in accordance with claim 10 wherein said integrating means includes a field effect transistor switch.

12. A circuit for testing a segment of a digital display comprising:

a segment of a digital display having a cathode filament for conducting electrical current to emit electrons therefrom;

means for selecting said segment of said digital display for testing the proper operation thereof, said selecting means including a grid disposed adjacent said cathode filament and means operatively connected to said grid for biasing said grid to inhibit or promote the flow of emitted electrons from said cathode filament; and detecting means operatively connected to said cathode filament for detecting change in electrical current flow thereacross when said digital display segment is caused to be energized and when said digital display segment is caused to be de-energized, said detecting means including:

a filament power source of electrical current, one side thereof being operatively connected to the first side of said cathode filament and the second side of said filament power source being operatively connected to the second side of said cathode filament, and resistance means operatively connected between said second side of said cathode filament and electrical ground, said detecting means further comprising a sample and hold circuit operatively connected across said resistance means for subtracting grid current to provide a resultant current indicative of the current flowing across said cathode filament.

13. The circuit in accordance with claim 12 further comprising a grid bias power source operatively connected between said resistance means and electrical ground for biasing said grid.

14. The circuit in accordance with claim 12 wherein said sample and hold circuit comprises:

a comparator for providing a signal indicative of the current flowing across said cathode filament;

a switch and a buffer amplifier connected in series between said comparator and said second side of said cathode filament; and a capacitor operatively connected between said resistance means and said switch.

15. A circuit for testing a segment of a digital display comprising:

a segment of a digital display having a cathode filament for conducting electrical current to emit electrons therefrom;

means for selecting said segment of said digital display for testing the proper operation thereof, said selecting means including a grid disposed adjacent said cathode filament and means operatively connected to said grid for biasing said grid to inhibit or promote the flow of emitted electrons from said cathode filament; and detecting means operatively connected to said cathode filament for detecting change in electrical current flow thereacross when said digital display segment is caused to be energized and when said digital display segment is caused to be de-energized, said detecting means including:

a filament power source of electrical current, one side thereof being operatively connected to the first side of said cathode filament and the second side of said filament power source being operatively connected to the second side of said cathode filament, and resistance means operatively connected between said second side of said cathode filament and electrical ground, said detecting means further comprising an A/D converter operatively connected across said resistance means for subtracting grid current in the microprocessor from said cathode filament current to provide a resultant current indicative of the current flowing across said cathode filament.

16. The circuit in accordance with claim 15 further comprising a grid bias power source operatively connected between said resistance means and electrical ground for biasing said grid.

17. A method for testing the proper operation of digits of a digital display, each of said digits having a digit control grid and a plurality of segments, each of said segments having a segment driver and sharing a common cathode, the steps comprising:

(a) selecting the segment driver of one of said plurality of segments of said digits;

(b) energizing the digit control grid of one of said digits to energize the digit corresponding thereto;

(c) energizing said selected segment driver; and (d) de-energizing said selected segment driver and determining whether the current flowing across the cathode corresponding to said selected segment decreases when said segment driver is de-energized thus indicating that said segment is operating properly.

18. The method for testing the proper operation of digits of a digital display in accordance with claim 17, the steps further comprising:

(e) sequentially energizing the digit control grids of each of the others of said digits to select the digits corresponding thereto;

(f) energizing said selected segment driver; and (g) sequentially determining whether the current flowing across the cathode corresponding to the selected segment of each of the sequentially selected digits decreases when said segment driver de-energized, thus indicating that said segment of said digit is operating properly.

19. The method for testing the proper operation of digits of a digital display in accordance with claim 18, the steps further comprising:

(h) sequentially selecting the segment drivers of each of the others of said segments to select the segments corresponding thereto; and (i) performing steps (e), (f) and (g) sequentially and repeatedly for each of the segments of each of the digits of the digital display.

* * * * *